United States Patent [19]
Eglit

[11] Patent Number: 6,023,262
[45] Date of Patent: Feb. 8, 2000

[54] METHOD AND APPARATUS IN A COMPUTER SYSTEM TO GENERATE A DOWNSCALED VIDEO IMAGE FOR DISPLAY ON A TELEVISION SYSTEM

[75] Inventor: Alexander Julian Eglit, Half Moon Bay, Calif.

[73] Assignee: Cirrus Logic, Inc., Fremont, Calif.

[21] Appl. No.: 08/671,974

[22] Filed: Jun. 28, 1996

[51] Int. Cl.[7] ...................................................... G09G 5/00
[52] U.S. Cl. ........................... 345/131; 345/132; 348/443
[58] Field of Search ........................... 345/115–116, 127, 345/131–132, 3, 439; 348/443, 446, 447

[56] References Cited

U.S. PATENT DOCUMENTS

| | | | |
|---|---|---|---|
| 5,025,315 | 6/1991 | Johary et al. ............................ | 358/140 |
| 5,047,839 | 9/1991 | Sawada .................................... | 358/22 |
| 5,136,379 | 8/1992 | Ishii ........................................ | 358/138 |
| 5,142,363 | 8/1992 | Johary et al. ............................ | 358/140 |
| 5,182,643 | 1/1993 | Futscher .................................. | 348/447 |
| 5,229,853 | 7/1993 | Myers ..................................... | 348/443 |
| 5,262,858 | 11/1993 | Butera et al. ........................... | 358/140 |
| 5,274,447 | 12/1993 | Nakagaki et al. ....................... | 358/140 |
| 5,343,299 | 8/1994 | Ishikawa ................................. | 348/445 |
| 5,406,306 | 4/1995 | Siann et al. .............................. | 345/115 |
| 5,422,678 | 6/1995 | Takeuchi ................................. | 348/581 |
| 5,426,465 | 6/1995 | Drewery .................................. | 348/427 |
| 5,455,628 | 10/1995 | Bishop ................................... | 348/446 |
| 5,473,382 | 12/1995 | Nohmi et al. ........................... | 348/448 |
| 5,497,199 | 3/1996 | Asada et al. ............................ | 348/446 |
| 5,510,843 | 4/1996 | Keene et al. ............................ | 348/446 |
| 5,682,179 | 10/1997 | Cahill, III ............................... | 345/127 |
| 5,742,349 | 4/1998 | Choi et al. .............................. | 348/443 |

*Primary Examiner*—Mark K. Zimmerman
*Assistant Examiner*—Ronald Laneau
*Attorney, Agent, or Firm*—Robert P. Bell; Steven A. Shaw

[57] ABSTRACT

A graphics controller circuit in a computer system for generating display signals to a television. The graphics controller circuit may downscale a display image to generate a downscaled image. While downscaling, the graphics controller circuit may generate each horizontal line of a downscaled image from a different number of horizontal lines of a display image. In addition, the graphics controller circuit uses clock signals with different frequencies so as to generate each horizontal line of the downscaled image in the same amount of time. The clock frequencies are designed to generate downscaled image horizontal lines at an input rate required for a television. In effect, the graphics controller circuit may avoid dropping display image horizontal lines while downscaling, and also reduce flicker while displaying the downscaled image on a television.

26 Claims, 5 Drawing Sheets

| Row No. | Display Unit Resolution | NTSC Conversion | PAL Conversion | NTSC Sub-grouping | PAL Sub-grouping | NTSC Max. Vclock Freq. | PAL Max. Vclock Freq. |
|---|---|---|---|---|---|---|---|
| 1. | 640 X 480 | 12-->5 | 2-->1 | 2,2,3,2,3 | 2 | 42.95 MHz | 35.47 MHz |
| 2. | 800 X 600 | 3-->1 | 5-->2 | 3 | 2,3 | 42.95 MHz | 53.20 MHz |
| 3. | 1024 X 768 | 96->25 | 16-->5 | 21.4 + 4.3 | 3,3,3,3,4 | 57.27 MHz | 70.94 MHz |
| 4. | 640 X 400 | 2-->1 | 5-->3 | 2 | 2,2,1 | 28.64 MHz | 35.47 MHz |

METHOD AND APPARATUS IN A COMPUTER SYSTEM TO GENERATE A DOWNSCALED VIDEO IMAGE FOR DISPLAY ON A TELEVISION SYSTEM

FIELD OF THE INVENTION

The present invention relates generally to computer graphics systems and more specifically to a method and apparatus for displaying a downscaled video image on a television system.

BACKGROUND OF THE INVENTION

A computer system may use a television system as an output display device. For the purposes of this application, the term "television" may include, but is not limited to, NTSC, PAL or SECAM televisions, receivers, and monitors, or the like. In addition, as used herein, the term "television" may also refer to other types or formats of television displays including HDTV, either analog (e.g., MUSE) or digital.

Such a computer system may however be designed to generate an output having different characteristics than an input required by a television system. For example, a computer system implementing a VGA standard may generate an output image of 640×480 pixels at a rate of 72 frames per second. On the other hand, a television system implementing NTSC standard may have 525 horizonal lines divided into even and odd interlaced fields of 262.5 lines each as shown in FIG. 1A.

Figure 1A:
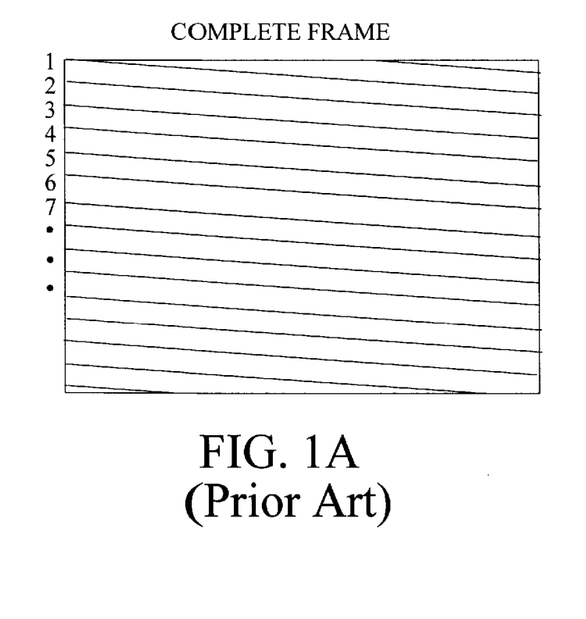
FIG. 1A depicts a frame of a prior art interlaced display image.
Figure 1B:
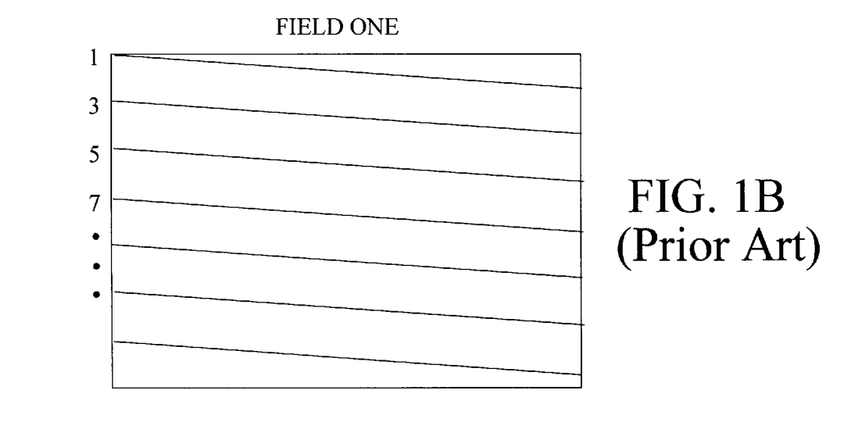
FIG. 1B depicts an odd field of a prior art interlaced display image.
Figure 1C:
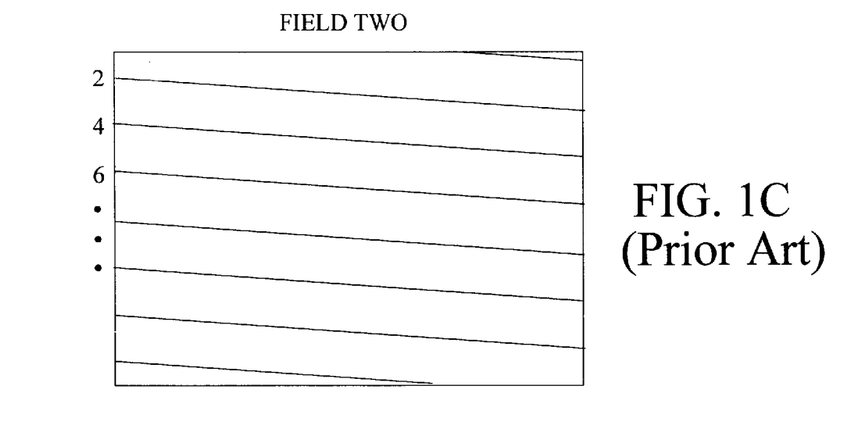
FIG. 1C depicts an even field of a prior art interlaced display image.

FIG. 1A depicts a frame of an NTSC image (or other interlaced image). Each frame of the NTSC image is comprised of interlaced even and odd fields. FIG. 1B depicts field one, the odd field which comprises odd numbered scan lines. FIG. 1C depicts field two, an even field which comprises even numbered scan lines. The two fields are interlaced to produce the composite frame in FIG. 1A. Each frame of FIG. 1A may be refreshed at a pre-determined frame rate. For an NTSC image such frame rate may be 30 Hz. The fields may be refreshed at a field rate twice the frame rate, which for an NTSC image would be 60 Hz.

Of the 525 horizontal lines in an NTSC video signal, some may be taken up with what is known as the Vertical Blanking Interval (VBI) which includes pre-equalizing pulses (occupying three horizontal lines), the vertical sync pulse interval (occupying three horizontal lines), post-equalizing pulses (occupying three horizontal lines), and ten to fourteen non-video lines, which may be used for reference sub-carrier phase, close captioning, descrambling data, or other so-called "in-band" data. As a result, of the 525 horizontal lines in an NTSC video signal, only 480 may be available for active video.

These 480 lines of active video could be used to display 480 lines of pixel data from a 640 by 480 pixel resolution VGA display with relative ease. However, a television, unlike a computer monitor, uses a technique known as overscan to insure that the picture fills the entire video display (e.g., picture tube). Unfortunately, this overscan technique, when applied to the output of a computer system may result in a display image having truncated upper and lower portions as well as truncated left and right portions. For a computer display image, such truncation is not acceptable, as useful information may appear in the truncated portions of the display image.

Thus, in order to display a high resolution computer system (Ex. VGA, SVGA) video display on a television, the vertical resolution of the display may be decreased to accommodate the limitation of the television. For most commercially sold televisions, vertical overscan rarely exceeds 15%. Thus, if the computer system output display image could be adapted to fit within 400 lines (For an NTSC television), all of the display image may appear on a television system without being truncated due to overscan. As a computer system output display may include more horizontal lines (for example 480 horizontal lines in the case of VGA standard, and 768 in the case of SVGA standard), there is a need to filter the horizontal lines to downscale the computer system output display.

An additional problem is presented when attempting to display a high resolution computer system video output on an interlaced video display such as a television. High resolution computer systems (e.g., VGA, SVGA or the like) may store image data as individual pixel data in non-interlaced form in a video memory (VMEM). The pixel data may be scanned out of the video memory in sequence, converted into analog form, and displayed on a VGA compatible monitor. In order to generate a display image without flicker, a VGA compatible monitor may be refreshed at a relatively high refresh rate (e.g., 60 or 75 Hz) in order to take advantage of the persistence of vision phenomenon.

However, an interlaced video display such as a television may be refreshed at a lower frame rate, for example, 30 Hz. For a typical analog television signal, with relatively low resolution and contrast, such a refresh rate is acceptable for viewing without perceptible flicker. However, a computer display image such as a graphics display image may include a high contrast image having a horizontal line or edge which is one pixel (i.e., one horizontal line) in height. Such a line may only appear on one of two interlaced (even and odd) fields and thus may be refreshed only once per frame. For the viewer, such lines or edges may have a perceptible flicker which may make viewing the image annoying and disorienting.

In general, it has been noted that such flicker effects are usually found at horizontal edges or in thin horizontal lines where the intensity or color of the line or edge is substantially different from an adjacent line in the opposite field (i.e., high contrast areas). For example, a black horizontal line on a white background may exhibit such a flicker effect. One technique for reducing flicker involves averaging or otherwise combining each line of an interlaced display with a portion of one or more adjacent lines so as to reduce the apparent contrast between adjacent lines and thus reduce flicker.

A prior computer system may include additional circuitry to combine adjacent horizontal lines of the computer system output image and to downscale the computer system output image for display on a television. Such downscaling may be required for the television to avoid truncation of output image as explained above or to otherwise fit a computer system output image of a high resolution in a field (shown in FIGS. 1B and 1C). The additional circuitry may either modify a pre-existing circuit (for example, a circuit that generates VGA or SVGA compatible output image) or be implemented as a separate module that modifies an output of such pre-existing circuit.

The design of such an additional circuitry may be complex as the number of horizontal lines in a computer system output image may not be an integral multiple of number of horizontal lines in a frame of a television display. For example, displaying a VGA output image on an NTSC television may require downscaling from 480 horizontal lines to 400 lines per television frame as explained above.

A prior art computer system may drop (or ignore) one out of every six horizontal VGA lines, and generate five horizontal lines for television display by combining the remaining five VGA horizontal lines. The computer system may drop horizontal VGA lines as the television may require input at a pre-determined constant rate, for example one line for every 63.56 micro seconds in the case of an NTSC television.

One problem with such a prior art system is that display information may be lost due to line dropping. For example, a spread sheet/graphics/CAD application may generate a horizontal line of one pixel height (i.e., one horizontal line), and that horizontal line may be dropped. Line dropping may also result in perceptible flicker as the information corresponding to dropped lines may be refreshed only in some frames. The flicker problem and information loss problem may be compounded due to the high contrast generally present in computer displays. Due to such problems, the television display quality may be unacceptable.

SUMMARY OF THE INVENTION

The present invention is described in the context of a graphics controller circuit which downscales a display image to generate a downscaled image. The display image may comprise a plurality of display image horizontal lines and the downscaled image may comprise a plurality of downscaled image horizontal lines. The graphics controller circuit may include a pixel data generator for generating a first set of display image horizontal lines and a second set of display image horizontal lines, the first set of display image horizontal lines and the second set of display image horizontal lines being comprised in the plurality of display image horizontal lines.

A converter may generate a first downscaled image horizontal line by combining the first set of display image horizontal lines, and a second downscaled image horizontal line by combining the second set of display image horizontal lines. The two sets of display image horizontal lines may comprise a different number of horizontal lines. The first downscaled image horizontal line and the second downscaled image horizontal line may be comprised in the plurality of downscaled image horizontal lines.

A clock generation circuit may generate a set of clock signals to cause the pixel data generator to generate the first set of display image horizontal lines and the second set of display image horizontal lines. A control logic may cause the clock generation circuit to generate the set of clock signals with a first frequency when the pixel data generator generates the first set of display image horizontal lines, and to generate the clock signals with a second frequency when the pixel data generator generates the second set of display image horizontal lines.

By using the clock signals with different frequencies, the graphics controller circuit of the present invention may generate the first set of display image horizontal lines and the second set of display image horizontal lines in the same amount of time. The converter may accordingly generate the first and second downscaled image horizontal lines in the same amount of time.

The converter may be coupled to a television, and the first downscaled image horizontal line and the second downscaled image horizontal line may be comprised in an interlaced input to the television. The control logic may control the frequency of the clock signals so as to generate the downscaled image horizontal lines at an input rate required by the television. By using different number of display image horizontal lines for generating downscaled image horizontal lines, and by using a different clock frequency, graphics controller circuit of the present invention avoids dropping lines while downscaling.

The clock generation circuit may include a frequency synthesizer for generating clock signals with the first frequency, and a clock divider circuit for generating the clock signals with the second frequency from the clock signals with the first frequency. A multiplexor may couple to the converter one of the clock signals with the first frequency or the clock signals with the second frequency under the control of the control logic. The second frequency may comprise ½ or ⅔ or ¾ of the first frequency.

The converter circuit may further comprise a horizontal downscaler for downscaling the plurality of display image horizontal lines in a horizontal direction to generate a plurality of horizontally downscaled lines. A combining circuit may combine the plurality of horizontally downscaled lines to generate the first downscaled image horizontal line and the second downscaled image horizontal line.

The graphics controller circuit may further comprise an interlacer circuit to receive the first downscaled image horizontal line and the second downscaled image horizontal line at a first rate, and to send the first downscaled image horizontal line and the second downscaled image horizontal line at a second rate. The graphics controller circuit may also include a horizontal upscaler to upscale the first downscaled image horizontal line and the second downscaled image horizontal line in a horizontal direction.

DETAILED DESCRIPTION OF THE INVENTION

The present invention is described in the context of graphics controller circuit 220 (shown in FIG. 2) which generates display signals corresponding to a computer display image to display unit 230, and also downscales the computer display image for display on television 299. Graphics controller circuit 220 of the present invention may include graphics controller core circuit 320 (shown in FIG. 3) for generating pixel data corresponding to a computer display image.

Conversion circuit 330 (also shown in FIG. 3) of the present invention may generate horizontal lines of an interlaced frame for display on television 299. To generate the horizontal lines, conversion circuit 330 may generate pixel data or analog signals or any other signals which may be adapted for input to television 299. In general, in the present application, generating a horizontal line may refer to generating pixel data or any other signal data which may be accepted as an input by subsequent elements.

Figure 3:
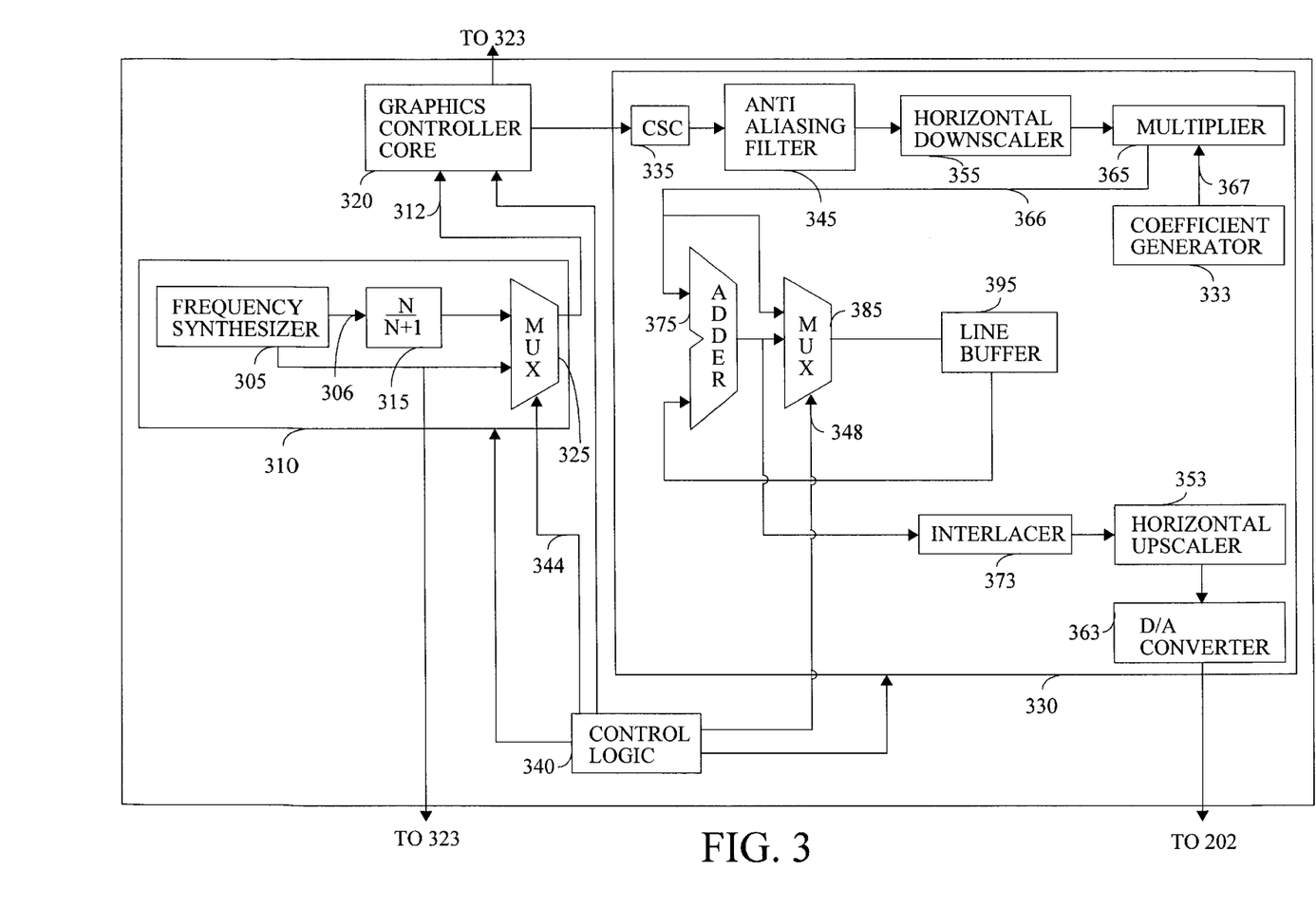
FIG. 3 is a block diagram of a graphics controller circuit of the present invention comprising a converter circuit, a graphics controller core, a clock generation circuit and a control circuit.

Conversion circuit 330 may generate different horizontal lines of an interlaced field by combining a different number of computer display image horizontal lines. Such a generation allows graphics controller circuit 220 to utilize all horizontal lines of the computer display image even though the number of horizontal lines in computer display image may not be an integral multiple of number of horizontal lines in a television field.

In addition, graphics controller circuit 220 of the present invention may include clock generation circuit 310 which drives graphics controller core 320 at different clock frequencies while generating different horizontal lines of a television field. The clock frequency may be higher if the number of computer display image horizontal lines used in generating a corresponding television field horizontal line is higher. Such a variable clock frequency allows graphics controller circuit 220 of the present invention to generate each horizontal line of a television field in a same amount of time (for example, 63.56 Micro seconds for NTSC television). Graphics controller circuit 220 may avoid line dropping by using such a variable clock frequency. As a result, the display on television 299 may be of acceptable quality.

Referring back to FIG. 2, FIG. 2 is a block diagram of computer system 200 of the present invention. Host 210 may send display data and commands over system bus 212 to graphics controller circuit 220. Such display data may comprise video (for example a television signal encoded in an RGB format) or graphics (data corresponding to each pixel of an image) or text data. Host 210 may be conventional in the art and may comprise a processor and a memory. System bus 212 may comprise, for example, a PCI bus.

Figure 2:
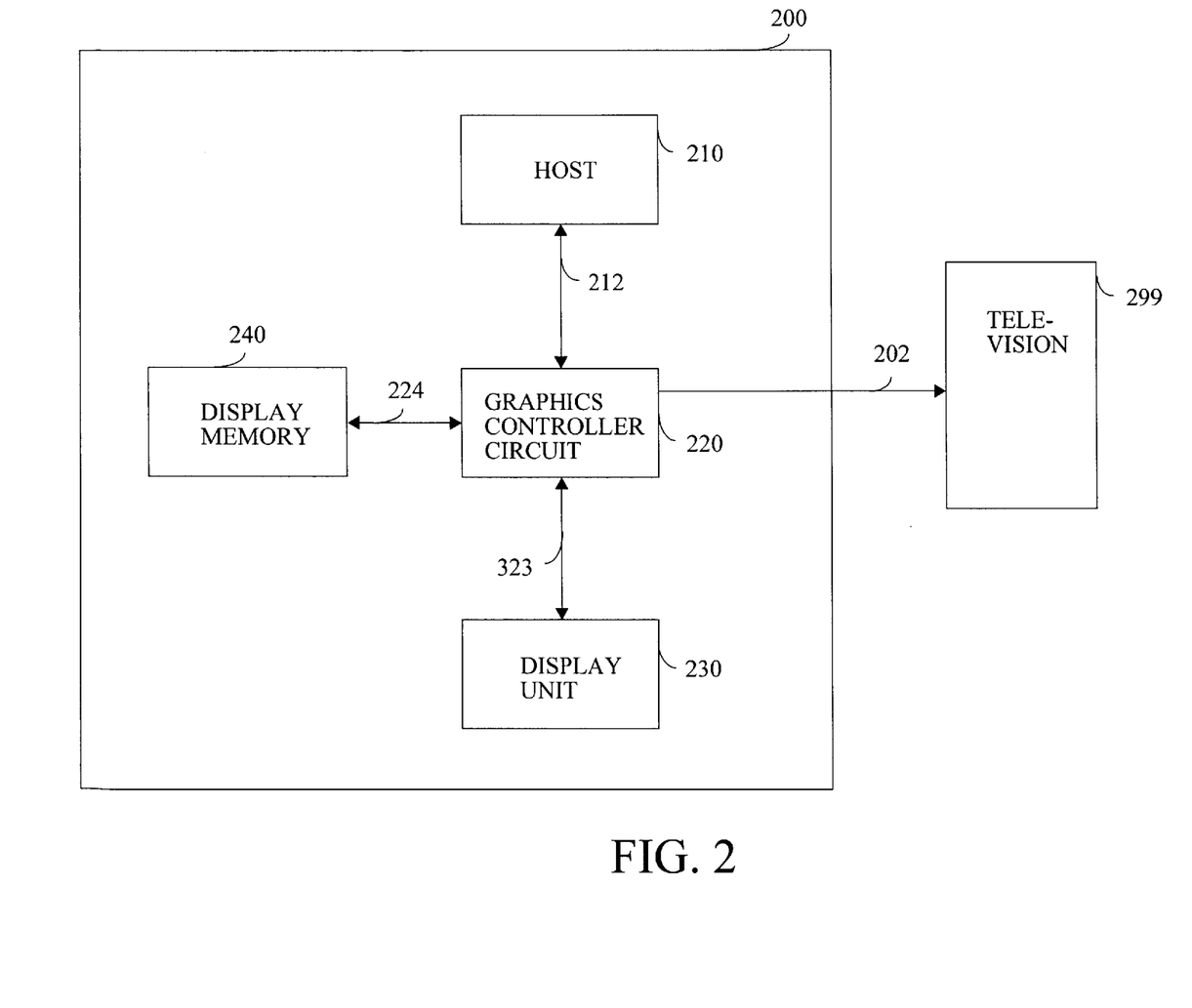
FIG. 2 is a block diagram of a computer system of the present invention comprising a graphics controller circuit, a display memory, a display unit and a host.

Display memory 240 may buffer display data received from graphics controller circuit 220. Display memory 240 may comprise a random access memory (e.g., DRAM, SRAM or the like). Display memory 240 may also be known as a video memory or VMEM in the graphic controller arts. However, due to the advent of Motion Video displays in computer systems, the term "video memory" may be a misnomer. Thus, for the purposes of this application, such a memory will be referred to as a display memory.

Graphics controller circuit 220 may receive display data and commands from host 210, and store the received display data in display memory 240. Graphics controller circuit 220 may then retrieve display data from display memory 240, process the display data according to commands received from host 210 to generate display signals corresponding to a computer display image on display bus 223 to display unit 230. Display unit 230 may be, for example, a conventional monitor implementing well-known standards such as VGA, SVGA or EGA.

Graphics controller circuit 220 may also generate signals corresponding to interlaced fields (illustrated in FIGS. 1B and 1C) to television 299 over bus 202 in accordance with the present invention. Hence if television 299 is NTSC compatible, the signals to television 299 may include 200 horizontal lines per field. If television 299 is PAL compatible, the signals to television 299 may include 240 horizontal lines per field. Also, graphics controller circuit 220 may generate each horizontal line according to the scan rate of television, for example, for an NTSC compatible television 299 at one horizontal line per 63.56 microseconds.

Figure 4:
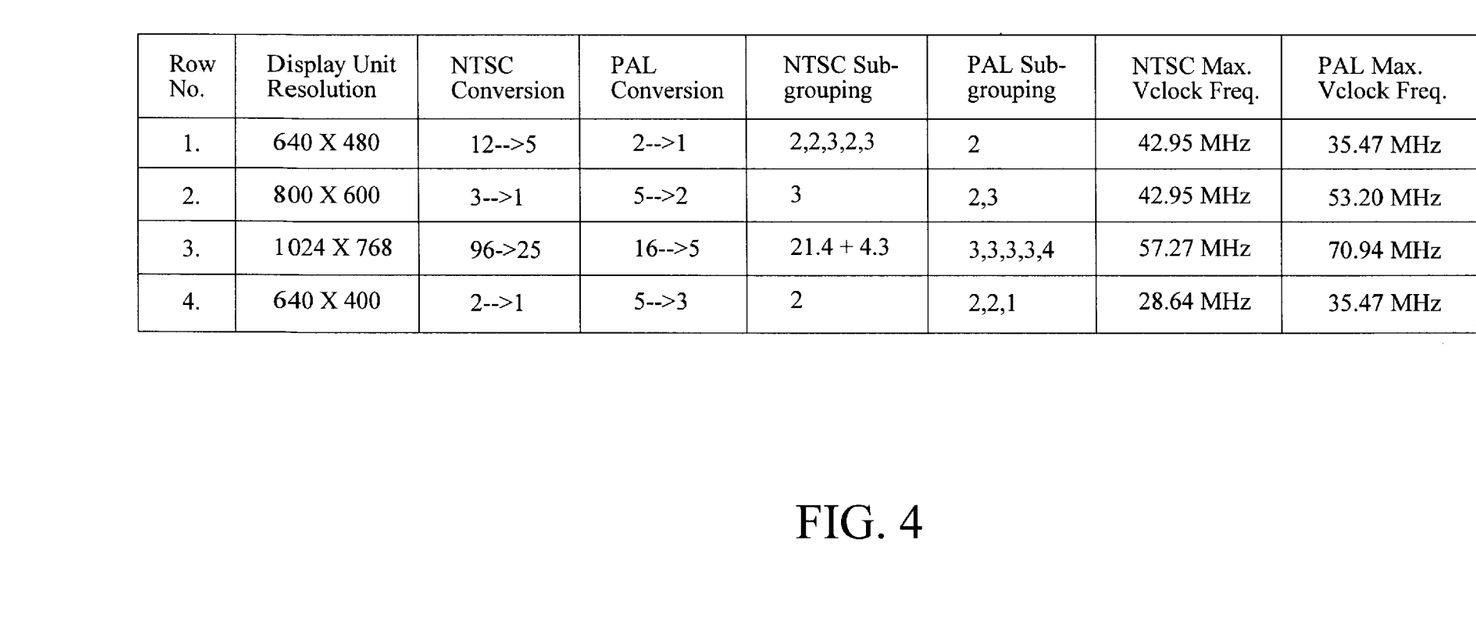
FIG. 4 is a table illustrating the operation of the graphics controller circuit in generating display signals to a television, wherein the display signals correspond to a downsized computer display image.

FIG. 4 is a table further illustrating the manner in which graphics controller circuit 220 may generate signals for television horizontal lines in accordance with the present invention. Row 1 illustrates conversion of 480 horizontal lines of a VGA display for both NTSC and PAL television systems. For NTSC, graphics controller circuit 220 may convert every 12 horizontal lines of a VGA display to 5 horizontal lines of a television display as shown in 'NTSC Conversion' column. For PAL, every 2 horizontal lines of a VGA display may be converted to 1 horizontal line of a television interlaced field.

To convert 12 horizontal lines of a VGA display to 5 horizontal lines of television display, graphics controller circuit 220 may logically divide the 12 lines into 5 sub-groups. The 5 sub-groups may include (2,2,3,2,3) horizontal lines respectively as shown in 'NTSC sub-grouping' column. By combining horizontal lines in each sub-group in one of several well-known schemes known in the art, graphics controller circuit 220 may generate signal data for one horizontal television display line.

In addition, graphics controller circuit 220 may have an internal clock (shown as clock generation circuit 310 in FIG. 3) to generate clock signals at different frequencies while processing sub-groups of different sizes. By using such different frequencies, graphics controller circuit 220 may generate signal data for each television display horizontal line in the same amount of time.

For example, in row 1, while generating signal data for an NTSC television 299 from a sub-group having 3 VGA horizontal lines, graphics controller circuit 220 may use an internal clock frequency of 42.95 MHz as shown in 'NTSC Max Vclock Freq.' column. On the other hand, while processing a sub-group having only 2 VGA horizontal lines, graphics controller circuit 220 may use an internal clock frequency of $2/3$ of 42.95 MHz.

By using such a proportionately lower frequency while processing a sub-group with lower number of lines, graphics controller circuit 220 may generate signal data for television horizontal lines in the same amount of time (for example, within 63.56 Microseconds from each sub-group for an NTSC television 299). Also, by using different number of lines in different sub-groups, graphics controller circuit 220 may use all horizontal lines of computer system display on display unit 230. Using variable clock frequency may enable graphics controller circuit 220 to avoid dropping horizontal lines of computer system display.

To convert 96 lines of computer system display into 25 NTSC lines in row 3, graphics controller circuit 220 may use 21 sub-groups with 4 lines each, and 4 sub-groups with 3 lines each. Columns relating to PAL conversion are also explained similar to above. For example, in row 2, to convert 600 horizontal lines of computer system display to 240 horizontal lines of PAL display, graphics controller circuit 220 may convert a group of 5 lines into 2 lines of PAL display. The 5 lines in a group may be logically divided into 2 sub-groups having 2 and 3 lines respectively. An internal clock frequency of 53.20 MHz may be used while processing 3 line sub-group, and $2/3$ of 53.20 MHz frequency may be used while processing 2 line sub-group.

FIG. 3 is a block diagram of graphics controller circuit 220 which generates signal data for television fields in accordance with the table of FIG. 4. Graphics controller circuit 220 may comprise a pixel data generator such as graphics controller core 320, clock generation circuit 310, converter circuit 330 and control logic 340. Control logic 340 may generate control signals to coordinate and control the operation of clock generation circuit 310, graphics controller core 320, converter circuit 330 and control logic 340 in accordance with the present invention.

Graphics controller core 320 in a preferred embodiment may comprise a conventional circuit which generates display signals of a computer display image in one of conventional standards such as VGA, SVGA and EGA. In the process of generating such display signals, graphics controller core 320 may also generate pixel data corresponding to such a computer display image, and send the pixel data over display bus 223. Each pixel data may correspond to a pixel of an image to be displayed display unit 230, and each such pixel data may be in an RGB format. It will however be appreciated that the display signals generated by graphics controller core 320 (pixel data generator) may be in any other format without departing from the scope and spirit of the present invention.

Graphics controller core 320 may be driven by clock signals (herein after referred to as Vclock) received over vclock signal line 312. Therefore, the rate at which graphics controller circuit 320 generates pixel data may be determined by the Vclock frequency. Control logic 340 may vary Vclock frequency depending on the number of lines in a sub-group being converted into a television display horizontal line. The frequency may be varied so as to generate each horizontal line data of television display in the same amount of time.

Clock generation circuit 310 generates Vclock signal on vclock signal line 312. Clock generation circuit 310 may comprise frequency synthesizer 305, frequency divider 315, and multiplexor 329. Frequency synthesizer 310 may generate clock signals with a base frequency equal to frequency shown in 'NTSC Max. Vclock Freq.' column (or 'PAL Max. Vclock Freq.' if television 299 is PAL compatible) of Table 1. Frequency synthesizer 310 may select the appropriate base frequency under the control of control logic 340.

Frequency divider 315 may receive as input the base frequency clock signals, and generate as output divided frequency clock signals with frequency of N/N+1 of the base frequency, where N is equal to the number of horizontal lines in the smallest sub-group. For example, while converting a 640×480 or 800×600 resolution picture (shown in Rows 1 and 2 respectively of FIG. 4), N may be equal to 2 as the smallest sub-group has 2 horizontal lines. Similarly, in rows 3 and 4 of FIG. 4, N may be equal to 3 and 1 respectively. Frequency divider 315 may disable every Nth positive pulse in base frequency clock signals to generate the divided frequency clock signals.

Figure 5:
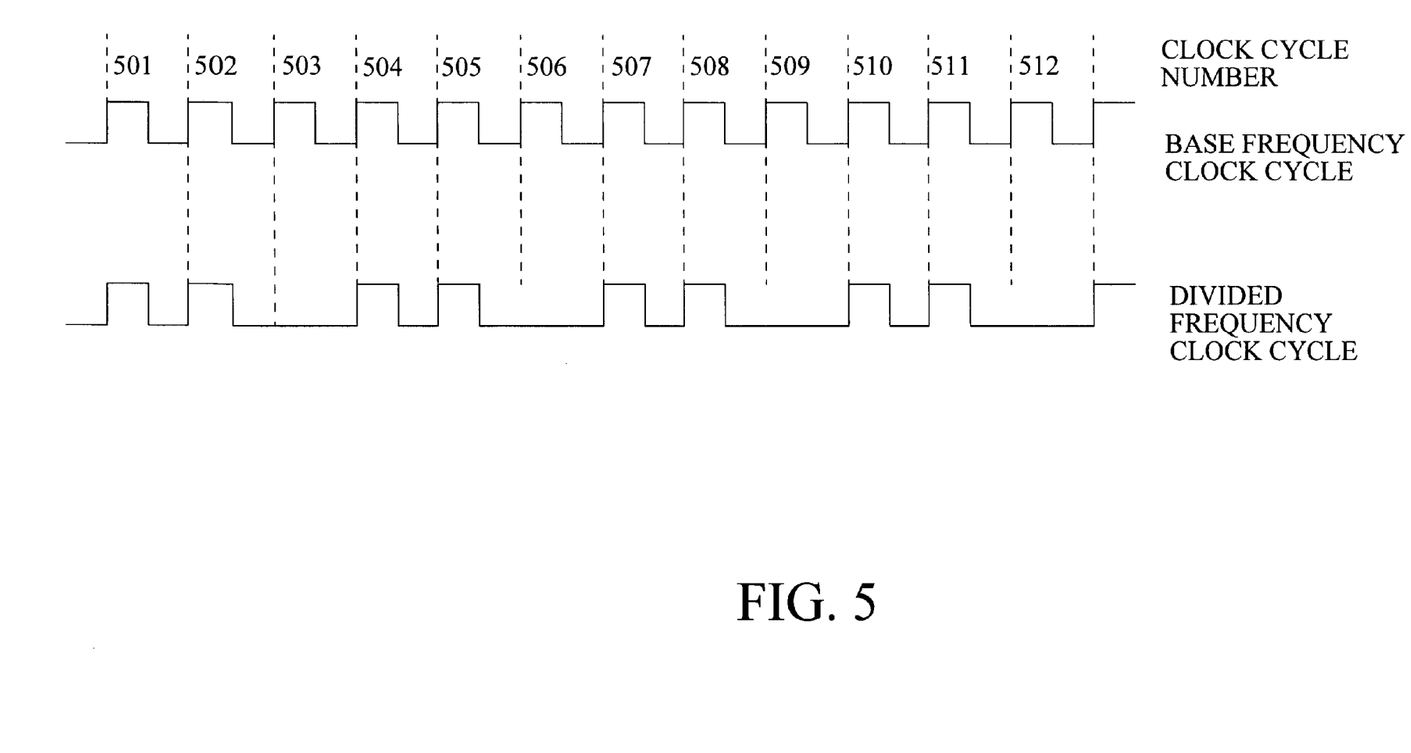
FIG. 5 is a diagram of clock signals illustrating the operation of a clock generation circuit of the present invention.

FIG. 5 is a diagram of the base frequency clock signals and the divided frequency clock signals for N=2. Frequency divider 315 is shown disabling positive transition of every third clock cycle (at the beginning of base frequency clock cycles 503, 506, 509 and 512) so as to generate divided frequency clock signals having a frequency of ⅔ of the base frequency.

Referring again to FIG. 3, multiplexor 329 may select as output either the base frequency clock signals or the divided frequency clock signals according to a value received on MUX select signal line 344. Control logic 340 may send the value, and may cause base frequency clock signals to be selected if pixel data of a sub-group of larger size is being generated by graphics controller core 320. Control logic 340 may cause the divided frequency clock signals to be selected if pixel data of a sub-group of smaller size is being generated by graphics controller core 320.

Converter 330 may receive pixel data (in RGB format) corresponding to a sub-group and generate signal data for one television horizontal display line from the sub-group pixel data. Converter 330 is designed to generate television horizontal display lines from sub-groups of different sizes. Converter 330 may combine pixel data from different horizontal lines to reduce flicker on television 299.

Converter 330 may comprise color space converter 335 to convert pixel data to YUV format comprising chrominance and luminance components. Such a conversion enables graphics controller circuit 220 to use only two buffers (in line buffer 395), one each for chrominance and luminance. Without such a conversion, three buffers may be needed, one each for R, G, and B components.

Anti-aliasing filter 345 may compress the chrominance data to ⅓, and consequently further reduce buffer size requirements in graphics controller circuit 220. Such a reduction scheme may be well known in the art, and may be achieved due to relatively high correlation present in chrominance component. It will however be appreciated that it is within the scope of the present invention for graphics controller circuit 220 to operate without converting the pixel to YUV format or without reducing the chrominance data.

Horizontal downscaler 355 may downscale each horizontal line within a sub-group to a desired number of pixels. One of several well known techniques in the art may be employed for such downscaling. By downscaling horizontal lines before using line buffer 395, the present invention minimizes buffer size requirements.

A combining circuit comprising multiplier 365, co-efficient generator 333, adder 375, multiplexor 385 and line buffer 395 operates to combine horizontal lines in a sub-group to generate pixel data of a television display horizontal line. To illustrate such operation with an example, assume eight horizontal lines L1–L8 from a 800×600 resolution computer system display image are being converted for display on a PAL compatible television 299. From Table 1, row 2 it will be seen that a sub-grouping of 2, 3 is chosen so as to generate 2 lines from each five lines of computer system image display.

Converter 330 operates to generate television display lines Y1, Y2 and Y3 by combining horizontal lines L1–L8 according to the following formulae:

$Y1 = a \times L1 + b \times L2 + a \times L3$ $Y2 = a \times L3 + b \times L4 + c \times L5 + a \times L6$ $Y3 = a \times L6 + b \times L7 + c \times L8$ where a, b and c are co-efficients.

If L8 is a last line in the computer system display image, Y3 may be generated without using L8. Co-efficient generator 333 may generate co-efficient a, b and c under the control of control logic 340. For example, while processing pixel data of lines L1 or L3, co-efficient generator 333 may generate a value corresponding to co-efficient 'a' on bus 367. The selection of values of co-efficients a, b, and c may be conventional in that art, and may be programmable.

Multiplier 365 may multiply each pixel data received from horizontal downscaler 355 with coefficient received on bus 367, and send the multiplication result over bus 366. Multiplier 365 may be a ROM (read only memory) for a superior throughput performance.

Line buffer 395 may store intermediate values in the iterative addition process for generating lines Y1 and Y2. For example, line buffer 395 may first store values corresponding to 'a×L1' after 'a×L1' is computed. Adder 375 may receive 'a×L1' from line buffer 395 and 'b×L2' during a subsequent cycle, and add the two values. Adder 375 may store the result of the addition in line buffer 395.

In a subsequent cycle, adder 375 may add 'a×L3' received from multiplier 365 and 'a×L1+b×L2' received from line buffer 395 to generate Y1. The result 'a×L1+b×L2+a×L3' may be stored in interlacer 373. However, control logic 340 may control multiplexor 385 to select as output 'a×L3' received from multiplier 365 over bus 366. Therefore, line buffer 395 may store 'a×L3' and begin computation of Y2.

It will be appreciated that Y2 may be generated in three cycles after Y1 is generated, which may correspond to number of horizontal lines in corresponding sub-group. Each subsequent television signal horizontal line is therefore generated within the same number of cycles as the number of horizontal lines in the corresponding group. It will be further appreciated that the present invention makes use of an additional horizontal line from a subsequent sub-group while generating each television signal horizontal line, which results in further reducing flicker on television display.

Horizontal upscaler 353 may receive pixel data for each television display horizontal line, and upscale the horizontal line in a horizontal direction if required. Such upscaling may be required if television display has a larger resolution than a computer display image. Horizontal upscaler 353 may be conventional in the art.

Interlacer 373 may serve as a buffer between horizontal upscaler 353 and D/A converter 363. Such a buffer may be required as the pixel data from horizontal upscaler 353 may be received at a higher rate than a rate at which television 299 may be refreshed. D/A converter 363 may convert digital pixel data in interlacer 373 to an analog signal. Such an analog signal may be provided as an input to television 299 to display an image corresponding to the image which may be displayed on display unit 230.

From the above description, it will be appreciated that graphics controller circuit 220 of the present invention has several advantages. Due to a modular design of the preferred embodiment, a designer may conveniently choose a conventional circuit such as a circuit which generates VGA signal data for graphics controller core 320, and implement converter 330 and clock generation circuit 310 to generate television display. Because of such a modular design, converter 320 and clock generation circuit 310 may be designed to operate with other conventional circuits which may generate pixel data for other known standards such as SVGA, EGA.

In addition, graphics controller circuit 220 of the present invention uses all lines of a computer system display image by using a sub-grouping scheme with different number of horizontal lines. Such a sub-grouping scheme also enables graphics controller circuit 220 to downscale computer system display images to television display images of different sizes. In addition, graphics controller circuit 220 avoids line-dropping by generating variable clock frequencies for sub-groups of different size. Graphics controller circuit 220 of the present invention further generates horizontal lines corresponding to an interlaced frame for display on television 299.

Although the present invention has been illustrated and described in detail, it is clearly understood that the same is by way of illustration and example only and is not to be taken by way of limitation, the scope and spirit of the present invention being limited only the terms of the appended claims.

What is claimed is:

1. A graphics controller for downscaling a display image, comprising:

a pixel data generator for generating a first set and a second set of horizontal lines of pixel data the first set of horizontal lines of pixel data comprising a different number of horizontal lines of pixel data than the second set of horizontal lines of pixel data;

a converter for generating a first downscaled image horizontal line by combining the first set of horizontal lines of pixel data, and generating a second downscaled image horizontal line by combining the second set of horizontal lines of pixel data; and a clock generator coupled to said pixel data generator, said clock generator generating a set of clock signals to said pixel data generator, the clock signals clocking said pixel data generator to generate the first set of horizontal lines of pixel data and the second set of horizontal lines of pixel data, said clock generator generating the set of clock signals at a first frequency when said pixel data generator generates the first set of horizontal lines of pixel data, and generating the set of clock signals at a second frequency when said pixel data generator generates the second set of horizontal lines of pixel data.

2. The graphics controller of claim 1 wherein said pixel data generator generates the first set of display image horizontal lines and the second set of display image horizontal lines in the same amount of time in response to the set of clock signals.

3. The graphics controller of claim 2 wherein said converter is coupled to a television, and wherein the first downscaled image horizontal line and the second downscaled image horizontal line are comprised in an interlaced input to the television.

4. The graphics controller of claim 3 wherein the graphics controller is comprised in a computer system.

5. The graphics controller of claim 1 wherein said clock generator comprises:

a frequency synthesizer for generating the set of clock signals with the first frequency;

a clock divider for generating the clock signals with the second frequency from the set of clock signals with the first frequency; and a multiplexor coupled to said frequency synthesizer and said clock divider, said multiplexor coupling to said converter one of the set of clock signals with the first frequency or the set of clock signals with the second frequency.

6. The graphics controller of claim 5 wherein the second frequency comprises ⅔ of the first frequency.

7. The graphics controller of claim 5 wherein the second frequency comprises ¾ of the first frequency.

8. The graphics controller of claim 5 wherein the second frequency comprises ½ of the first frequency.

9. The graphics controller of claim 1 wherein said converter comprises:

a horizontal downscaler for downscaling the plurality of display image horizontal lines in a horizontal direction to generate a plurality of horizontally downscaled lines; and a combiner coupled to said horizontal downscaler, said combiner combining the plurality of horizontally downscaled lines to generate the first downscaled image horizontal line and the second downscaled image horizontal line.

10. The graphics controller of claim 9 further comprising:
an interlacer to receive the first downscaled image horizontal line and the second downscaled image horizontal line at a first rate, and to send the first downscaled image horizontal line and the second downscaled image horizontal line at a second rate.

11. A graphics controller for downscaling a display image to generate a downscaled image, the display image comprising a plurality of display image horizontal lines, the downscaled image comprising a plurality of downscaled image horizontal lines, the graphics controller comprising:
a pixel data generator for generating a first set of display image horizontal lines and a second set of display image horizontal lines, the first set of display image horizontal lines and the second set of display image horizontal lines being comprised in the plurality of display image horizontal lines, the first set of display image horizontal lines comprising a different number of horizontal lines than the second set of display image horizontal lines;
a converter for generating a first downscaled image horizontal line by combining the first set of display image horizontal lines, said converter generating a second downscaled image horizontal line by combining the second set of display image horizontal lines, the first downscaled image horizontal line and the second downscaled image horizontal line being comprised in the plurality of downscaled image horizontal lines, wherein said converter comprises:
  a horizontal downscaler for downscaling the plurality of display image horizontal lines in a horizontal direction to generate a plurality of horizontally downscaled lines, and
  a combiner coupled to said horizontal downscaler, said combiner combining the plurality of horizontally downscaled lines to generate the first downscaled image horizontal line and the second downscaled image horizontal line, wherein said combiner comprises:
    a coefficient generator for generating a co-efficient corresponding to each of the plurality of display image horizontal lines,
    a multiplier for multiplying each of the plurality of the horizontally downscaled lines with a corresponding co-efficient to generate a multiplication output,
    an adder for adding the multiplication output and an another input to generate an intermediate value,
    a multiplexor for receiving the intermediate value and the multiplication output, the multiplexor selecting one of the intermediate value and the multiplication output as a multiplexor output under the control of said control logic, and
    a line buffer for storing the multiplexor output and for generating the multiplexor output as the another input to said adder;
a clock generator coupled to said pixel data generator, said clock generator generating a set of clock signals to said pixel data generator, the clock signals causing said pixel data generator to generate the first set of display image horizontal lines and the second set of display image horizontal lines; and
a control logic coupled to said clock generator, said control logic causing said clock generator to generate the set of clock signals with a first frequency when said pixel data generator generates the first set of display image horizontal lines, and to generate the set of clock signals with a second frequency when said pixel data generator generates the second set of display image horizontal lines.

12. A graphics controller for downscaling a display image to generate a downscaled image, the display image comprising a plurality of display image horizontal lines, the downscaled image comprising a plurality of downscaled image horizontal lines, the graphics controller comprising:
a pixel data generator for generating a first set of display image horizontal lines and a second set of display image horizontal lines, the first set of display image horizontal lines and the second set of display image horizontal lines being comprised in the plurality of display image horizontal lines, the first set of display image horizontal lines comprising a different number of horizontal lines than the second set of display image horizontal lines;
a converter for generating a first downscaled image horizontal line by combining the first set of display image horizontal lines, said converter generating a second downscaled image horizontal line by combining the second set of display image horizontal lines, the first downscaled image horizontal line and the second downscaled image horizontal line being comprised in the plurality of downscaled image horizontal lines, said converter comprising:
  a horizontal downscaler for downscaling the plurality of display image horizontal lines in a horizontal direction to generate a plurality of horizontally downscaled lines, and
  a combiner coupled to said horizontal downscaler, said combiner combining the plurality of horizontally downscaled lines to generate the first downscaled image horizontal line and the second downscaled image horizontal line;
a clock generator coupled to said pixel data generator, said clock generator generating a set of clock signals to said pixel data generator, the clock signals causing said pixel data generator to generate the first set of display image horizontal lines and the second set of display image horizontal lines;
a control logic coupled to said clock generator, said control logic causing said clock generator to generate the set of clock signals with a first frequency when said pixel data generator generates the first set of display image horizontal lines, and to generate the set of clock signals with a second frequency when said pixel data generator generates the second set of display image horizontal lines;
an interlacer to receive the first downscaled image horizontal line and the second downscaled image horizontal line at a first rate, and to send the first downscaled image horizontal line and the second downscaled image horizontal line at a second rate; and
a horizontal upscaler coupled to said interlacer, said horizontal upscaler upscaling the first downscaled image horizontal line and the second downscaled image horizontal line in a horizontal direction.

13. A graphics controller for use in a computer system for downscaling a display image to generate a downscaled image and generating a set of display signals to a television from the downscaled image, the display image comprising a plurality of horizontal lines, the downscaled image comprising a plurality of downscaled image horizontal lines, the graphics controller comprising:

a pixel data generator for generating a first set of and a second set of horizontal lines of pixel data, the first set of horizontal lines of pixel data comprising a different number of horizontal lines than the second set of horizontal lines of pixel data;

a converter for generating a first downscaled image horizontal line by combining the first set of horizontal lines of pixel data, said converter generating a second downscaled image horizontal line by combining the second set of horizontal lines of pixel data, said converter comprising:

a horizontal downscaler for downscaling the plurality of horizontal lines of pixel data in a horizontal direction to generate a plurality of horizontally downscaled lines;

a combiner coupled to the horizontal downscaler, said combiner combining the plurality of horizontally downscaled lines to generate the first downscaled image horizontal line and the second downscaled image horizontal line of pixel data; and an interlacer for receiving the first downscaled image horizontal line of pixel data and the second downscaled image horizontal line of pixel data at a first rate, and sending the first downscaled image horizontal line of pixel data and the second downscaled image horizontal line of pixel data at a second rate, wherein said television is designed to receive an input signal at the second rate;

a clock generator coupled to said pixel data generator, said clock generator generating a set of clock signals to said pixel data generator, the set of clock signals clocking said pixel data generator to generate the first set and the second set of horizontal lines of pixel data, said clock generator generating the set of clock signals with a first frequency when said pixel data generator generates the first set of horizontal lines of pixel data, and generating the set of clock signals with a second frequency when said pixel data generator generates the second set of horizontal lines of pixel data, said clock generation comprising:

a frequency synthesizer for generating the set of clock signals with the first frequency, a clock divider for generating the set of clock signals with the second frequency from the set of clock signals with the first frequency, and a multiplexor coupled to said frequency synthesizer and said clock divider, said multiplexor coupling to said converter one of the set of clock signals with the first frequency or the set of clock signals with the second frequency.

14. A computer system for generating a downscaled computer display image on a television, the display image comprising a plurality of horizontal lines, the downscaled image comprising a plurality of downscaled image horizontal lines, the computer system comprising:

a system bus;

a host for sending a set of display data and a set of commands over said system bus;

a display unit for displaying the computer display image; and a graphics controller coupled to said system bus, said graphics controller generating a set of display signals to display the downscaled image on a television by processing the set of display data and the set of commands, said graphics controller generating another set of display signals to display the computer display image on said display unit, said graphics controller comprising:

a pixel data generator for generating a first set and a second set of horizontal lines of pixel data, wherein said pixel data generator generates the another set of display signals from the first set second set of horizontal lines of pixel data, and wherein the first set of horizontal lines comprising a different number of horizontal lines than the second set of horizontal lines;

a converter for generating a first downscaled image horizontal line of pixel data by combining the first set of horizontal lines of pixel data, said converter generating a second downscaled image horizontal line of pixel data by combining the second set of horizontal lines of pixel data;

a clock generator coupled to said pixel data generator, said clock generator generating a set of clock signals to said pixel data generator, the set of clock signals causing said pixel data generator to generate the first set of display image horizontal lines and the second set of display image horizontal lines said clock generator generating the set of clock signals with a first frequency when said pixel data generator generates the first set of horizontal lines of pixel data, and generating the set of clock signals with a second frequency when said pixel data generator generates the second set of horizontal lines of pixel data.

15. The computer system of claim 14 wherein said pixel data generator generates the first set of horizontal lines of pixel data and the second set of horizontal lines of pixel data in the same amount of time in response to the set of clock signals.

16. The computer system of claim 15 wherein said clock generator comprises:

a frequency synthesizer for generating the set of clock signals with the first frequency;

a clock divider for generating the set of clock signals with the second frequency from the set of clock signals with the first frequency; and a multiplexor coupled to said frequency synthesizer and said clock divider, said multiplexor coupling to said converter one of the set of clock signals with the first frequency or the set of clock signals with the second frequency.

17. The computer system of claim 16 wherein the second frequency comprises ⅔ of the first frequency.

18. The computer system of claim 16 wherein the second frequency comprises ¾ of the first frequency.

19. The computer system of claim 16 wherein the second frequency comprises ½ of the first frequency.

20. The computer system of claim 15 wherein said converter comprises:

a horizontal downscaler for downscaling the plurality of horizontal lines of pixel data in a horizontal direction to generate a plurality of horizontally downscaled lines of pixel data; and a combiner coupled to said horizontal downscaler, said combiner combining the plurality of horizontally downscaled lines of pixel data to generate the first downscaled image horizontal line of pixel data and the second downscaled image horizontal line of pixel data.

21. The computer system of claim 20 further comprising an interlacer to receive the first downscaled image horizontal line of pixel data and the second downscaled image horizontal line of pixel data at a first rate, and to send the first downscaled image horizontal line of pixel data and the second downscaled image horizontal line at a second rate.

22. A computer system for generating a downscaled image of a computer display image, the computer system generating a set of display signals to display the downscaled image on a television, the display image comprising a plurality of display image horizontal lines, the downscaled image comprising a plurality of downscaled image horizontal lines, the computer system comprising:

a system bus;

a host for sending a set of display data and a set of commands over said system bus;

a display unit for displaying the computer display image; and a graphics controller coupled to said system bus, said graphics controller generating the set of display signals by processing the set of display data and the set of commands, said graphics controller generating an another set of display signals to display the computer display image on said display unit, said graphics controller comprising:

a pixel data generator for generating a first set of display image horizontal lines and a second set of display image horizontal lines, the first set of display image horizontal lines and the second set of display image horizontal lines being comprised in the plurality of display image horizontal lines, wherein said pixel data generator is designed to generate the another set of display signals from the first set of display image horizontal lines and the second set of display image horizontal lines, and wherein the first set of display image horizontal lines comprising a different number of horizontal lines than the second set of display image horizontal lines, wherein said pixel data generator generates the first set of display image horizontal lines and the second set of display image horizontal lines in the same amount of time in response to the set of clock signals;

a converter for generating a first downscaled image horizontal line by combining the first set of display image horizontal lines, said converter generating a second downscaled image horizontal line by combining the second set of display image horizontal lines, the first downscaled image horizontal line and the second downscaled image horizontal line being comprised in the plurality of downscaled image horizontal lines, wherein said converter comprises:

a horizontal downscaler for downscaling the plurality of display image horizontal lines in a horizontal direction to generate a plurality of horizontally downscaled lines, and a combiner coupled to said horizontal downscaler, said combiner combining the plurality of horizontally downscaled lines to generate the first downscaled image horizontal line and the second downscaled image horizontal line;

a clock generator coupled to said pixel data generator, said clock generator generating a set of clock signals to said pixel data generator, the set of clock signals causing said pixel data generator to generate the first set of display image horizontal lines and the second set of display image horizontal lines; and a control logic coupled to said clock generator, said control logic causing said clock generator to generate the set of clock signals with a first frequency when said pixel data generator generates the first set of display image horizontal lines, and to generate the set of clock signals with a second frequency when said pixel data generator generates the second set of display image horizontal lines, wherein said combiner comprises:

a coefficient generator for generating a co-efficient corresponding to each of the plurality of display image horizontal lines;

a multiplier for multiplying each of the plurality of the horizontally downscaled lines with a corresponding co-efficient to generate a multiplication output;

an adder for adding the multiplication output and an another input to generate an intermediate value;

a multiplexor for receiving the intermediate value and the multiplication output, the multiplexor selecting one of the intermediate value and the multiplication output as a multiplexor output under the control of said control logic; and a line buffer for storing the multiplexor output and for generating the multiplexor output as the another input to said adder.

23. A computer system for generating a downscaled image of a computer display image, the computer system generating a set of display signals to display the downscaled image on a television, the display image comprising a plurality of display image horizontal lines, the downscaled image comprising a plurality of downscaled image horizontal lines, the computer system comprising:

a system bus;

a host for sending a set of display data and a set of commands over said system bus;

a display unit for displaying the computer display image; and a graphics controller coupled to said system bus, said graphics controller generating the set of display signals by processing the set of display data and the set of commands, said graphics controller generating an another set of display signals to display the computer display image on said display unit, said graphics controller comprising:

a pixel data generator for generating a first set of display image horizontal lines and a second set of display image horizontal lines, the first set of display image horizontal lines and the second set of display image horizontal lines being comprised in the plurality of display image horizontal lines, wherein said pixel data generator is designed to generate the another set of display signals from the first set of display image horizontal lines and the second set of display image horizontal lines, and wherein the first set of display image horizontal lines comprising a different number of horizontal lines than the second set of display image horizontal lines, said pixel data generator generating the first set of display image horizontal lines and the second set of display image horizontal lines in the same amount of time in response to the set of clock signals;

a converter for generating a first downscaled image horizontal line by combining the first set of display image horizontal lines, said converter generating a second downscaled image horizontal line by combining the second set of display image horizontal lines, the first downscaled image horizontal line and the second downscaled image horizontal line being comprised in the plurality of downscaled image horizontal lines, said converter comprising:

a horizontal downscaler for downscaling the plurality of display image horizontal lines in a horizontal direction to generate a plurality of horizontally downscaled lines, and a combiner coupled to said horizontal downscaler, said combiner combining the plurality of horizontally downscaled lines to generate the first downscaled image horizontal line and the second downscaled image horizontal line;

a clock generator coupled to said pixel data generator, said clock generator generating a set of clock signals to said pixel data generator, the set of clock signals causing said pixel data generator to generate the first set of display image horizontal lines and the second set of display image horizontal lines;

a control logic coupled to said clock generator, said control logic causing said clock generator to generate the set of clock signals with a first frequency when said pixel data generator generates the first set of display image horizontal lines, and to generate the set of clock signals with a second frequency when said pixel data generator generates the second set of display image horizontal lines;

an interlacer to receive the first downscaled image horizontal line and the second downscaled image horizontal line at a first rate, and to send the first downscaled image horizontal line and the second downscaled image horizontal line at a second rate; and a horizontal upscaler coupled to said interlacer, said horizontal upscaler upscaling the first downscaled image horizontal line and the second downscaled image horizontal line in a horizontal direction.

24. A method of downscaling a display image in a graphics controller, the display image comprising a plurality of horizontal lines of pixel data, the downscaled image comprising a plurality of downscaled image horizontal lines of pixel data, the method comprising the steps of:

generating a first set and a second set of horizontal lines of pixel data, the first set of horizontal lines of pixel data comprising a different number of horizontal lines of pixel data than the second set of horizontal lines of pixel data;

combining the first set of horizontal lines of pixel data to generate a first downscaled image horizontal line of pixel data;

combining the second set of horizontal lines of pixel data to generate a second downscaled image horizontal line of pixel data;

controlling a rate at which said step of combining the first set of horizontal lines of pixel data generates the first set of display image horizontal lines of pixel data and said step of combining the second set of horizontal lines of pixel data generates the second set of display image horizontal lines of pixel data by generating a set of clock signals with a first frequency when said step of combining the first set of horizontal lines of pixel data generates the first set of display image horizontal lines of pixel data, and sending a set of clock signals with a second frequency when said step of combining the second set of horizontal lines of pixel data generates the second set of display image horizontal lines of pixel data.

25. The method of step 24 wherein said step of combining the first set of horizontal lines of pixel data generates the first set of display image horizontal lines of pixel data and said step of combining the second set of horizontal lines of pixel data generates the second set of display image horizontal lines of pixel data in the same amount of time in response to the set of clock signals.

26. The method of claim 25 further comprising the step of:

generating the set of clock signals of a second frequency from the set of clock signals of a first frequency.

* * * * *